United States Patent [19]

Nicolas

[11] Patent Number: 4,817,665

[45] Date of Patent: Apr. 4, 1989

[54] SAFETY VALVE

[76] Inventor: Yves J. M. Nicolas, 16 Square du Pont Colbert, 78000 Versailles, France

[21] Appl. No.: 145,419

[22] Filed: Jan. 19, 1988

[30] Foreign Application Priority Data

Jan. 21, 1987 [FR] France .............................. 87 00686

[51] Int. Cl.⁴ .............................................. F16K 17/04
[52] U.S. Cl. ..................................... 137/494; 251/50; 251/210; 251/282; 137/906
[58] Field of Search .................... 137/494, 906, 516.27; 251/50, 282, 210

[56] References Cited

U.S. PATENT DOCUMENTS

| 955,043 | 4/1910 | Barr | 137/516.27 X |
| 1,613,293 | 1/1927 | Reif | 251/210 |
| 4,653,527 | 3/1987 | Kosarzecki | 137/494 X |

FOREIGN PATENT DOCUMENTS 706266  3/1965  Canada .................................. 251/210

Primary Examiner—Robert G. Nilson
Attorney, Agent, or Firm—Dodge, Bush & Moseley

[57] ABSTRACT

Constructed in a cylindrical body (10) are a central chamber (16) fitted with a release hole (24) and two opposing chambers (18, 20). The ends of a floating piston (26) are engaged in these opposed chambers and subjected to both the pressure to be controlled and a reference pressure. A cylindrical box (34) integral to the piston (26) slides in the central chamber (16). In the closed position, the box (34) closes the release hole (24) to form a seal and the piston (26) closes the chamber under control (18) without forming a sealed closure. In the open position, a radial hole (48) cut in the wall of the box (34) is opposite the release hole (24). A decompression of the central chamber (16) is obtained as the valve starts to open (narrow channels 52) and a deceleration of the box (34) is obtained at the end of this opening (hole 44 and stud 54). Applications: Pressure relief valve for the oil industry, reactionless valve, pressure control nozzle.

7 Claims, 2 Drawing Sheets

SAFETY VALVE

The invention relates to a safety or pressure relief valve in particular for pipes conveying abrasive fluids under high pressure, such as the muds utilized for drilling oil or gas wells.

BACKGROUND OF THE INVENTION

Generally speaking, a safety or pressure relief valve comprises, on one hand, a hollow body closed by a plug defining a revolution volume formed from a relatively large central chamber and two relatively narrow opposed chambers and, on the other, a floating piston with its ends engaged in said chambers, one side of this piston being subjected to a reference thrust and the other to the pressure of the fluid to be controlled, the central chamber being in communication with the outside by a release hole.

Such a pressure relief valve is described in the German Pat. No. 1.083.096 (Eddelbutteb 1960) and the French Pat. No. 1.384.817 (SITA-1963).

Such valves suit the canalizations conveying non abrasive fluids subjected to medium pressure.

In the case of high pressure abrasive fluids (mud or cement, of the oil industry, under 700 bars, for example), at the moment the pressure to be controlled undergoes a sudden increase and generates, on the control end of the piston, a force greater than the reference thrust force applied to the other end, the fluid under control escapes at great speed all around the control end of the piston and its pressure drops immediately by lamination.

Due to the solid particles carried at great speed by the fluid, the edges of the chamber under control and those of the concerned end of the piston are rapidly eroded, with the result that, after a small number of discharges, a loss of sealing capacity is produced, at this level, which renders the valve unusable as is and requires it to be repaired.

SUMMARY OF THE INVENTION

The primary object of the invention is to remedy this major fault in the pressure relief valves currently available.

A second object of the invention relates to complementary means enabling the valve to be opened at an increased speed whilst preventing the valve from vibrating.

According to the invention, in a pressure relief valve as described above, the opposing chambers having identical diameters, the floating piston comprises a cylindrical box having a bottom and a wall, said box being arranged to slide in the central chamber of the valve, at least one longitudinal hole being pierced in said bottom and at least one radial hole pierced in said wall, so that, in a closed position of the valve the box's wall closes the discharge hole in a sealed manner and the piston closes the chamber under control in a non-sealed manner and, in an open position of the valve, the piston is clear of the control chamber and the radial hole is placed opposite the release hole.

According to a complementary characteristic of the invention, the box's wall comprises narrow channels connected to the radial hole, said channels being adapted to slide without damage over a seal associated with the release hole, during the initial opening movement of the piston.

Owing to this arrangement, the two basic functions of a pressure relief valve, which have until now been fulfilled by the same components, are separated from each other and assumed by two different components, each being specially adapted to its specific function.

As a result, the first of these functions, namely: to establish a seal in the closed position of the valve between the chamber under control and the release hole, is ensured by the box's wall in co-operation with the seals associated with this hole; whilst the second function, namely: to produce a pressure drop by lamination between this chamber and this hole when the valve starts to open, continues to be assured by the end of the piston engaged, in a non-sealing manner, in the chamber subjected to the pressure of the fluid to be controlled.

The particular adaptation of the sliding box for the repetition of the valve's first function results from the presence of narrow channels (longitudinal slots, for example,) connected to the radial hole. These channels first provide a quick decompression of the central chamber as soon as the sliding box starts its opening movement and, secondly they slide without damage on a seal which has just been released from its sealing function. From this the entire pressure loss by lamination between the chamber under control and the release hole is shifted to the space between this chamber and the concerned end of the piston. Under these conditions, as the end of the piston engaged in the chamber under control does not have to establish a seal, it is possible, by means of a hard metal sleeve placed at the chamber's inlet and a hard metal cap placed at the end of the piston, to obtain an efficient resistance to abrasion for these two components. Until now, this was not possible since these same components had moreover to establish the full sealing of the chamber under control, which is the object of the first function of the valve.

According to a second complementary characteristic of the invention, a stud mounted fixed in the valve is adapted to progressively close the longitudinal hole pierced in the box's wall when the box finishes its opening movement.

Owing to this arrangement, the opening movement of the box starts with a rapidly increasing speed and finishes with a progressively decreasing speed, which has the effect of suppressing the rebound of the piston at the end of the box's opening, while making possible a rapid opening start.

BRIEF DESCRIPTION OF THE DRAWINGS

The characteristics and advantages of the invention will be apparent in more precise a manner after the following description in the form of a non-limiting example, with reference to the appended drawings in which.

DETAILED DESCRIPTION OF THE PREFERRED EMBODIMENT

Figure 1A:
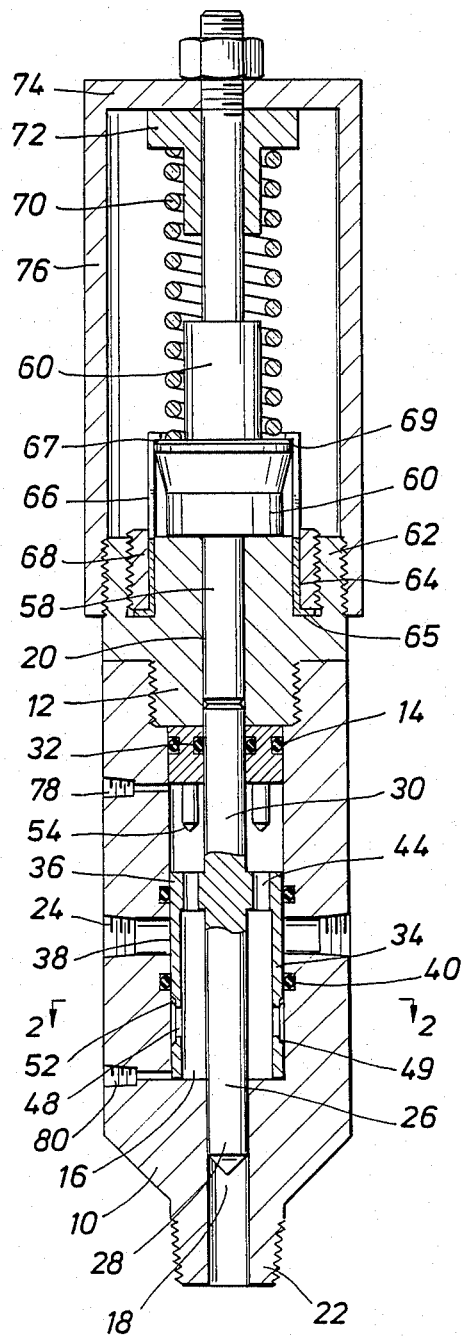
FIGS. 1A and 1B are a first form of implementation of the pressure relief valve constructed according to the invention, in opened and closed positions.
Figure 1B:
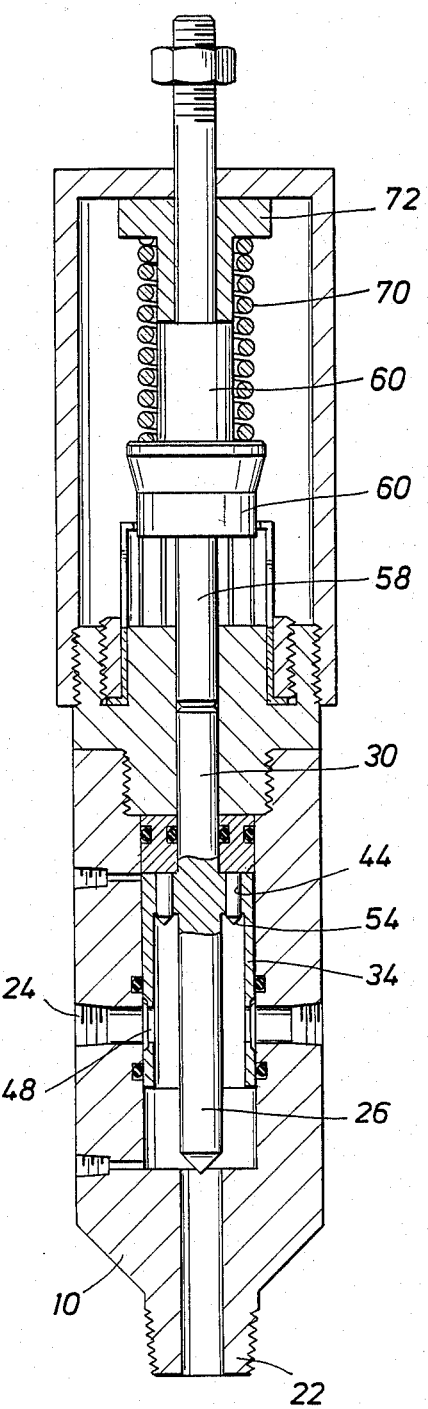

According to FIGS. 1A and 1B, the valve according to the invention includes a hollow cylindrical body 10 closed by a screw plug 12 equipped with an O-ring seal 14. The body 10 houses a revolution volume formed by a relatively large central chamber 16 and by a relatively narrow chamber under control 18, to which is opposed a reference chamber 20, of the same diameter, fitted in the plug 12. The body 10 further comprises a threaded coupling 22, crossed by the chamber under control 18 and adapted to be fixed on the fluid pipe under pressure, to be controlled.

At mid-height in the central chamber 16, pierced in the body's wall 10, are two diametrically opposed release holes 24, the insides of these holes being slanted and their outsides machined into tapered threads.

The body 10 and the plug 12 enclose a floating piston 26 whose cylindrical ends 28 and 30 are adapted to be engaged respectively in the chamber under control 18 with a very slight, but not zero, clearance and in the reference chamber 20, in an sealed manner owing to the presence of an O-ring seal 32.

The piston 26 comprises a cylindrical box 34, in its median portion, formed by a bottom 36 and a wall 38, adapted to slide in the central chamber 16. When the valve is in a closed position, (FIG. 1A) the edge of the wall 38 of the box 34 is close to the base of the central chamber 16, contiguous with the chamber under control 18 and the end 28 of the piston 26 is engaged in said chamber 18. When the valve is in an open position (FIG. 1B) the bottom 36 of the box 34 bears on the base of the central chamber 16 contiguous with the reference chamber 20 and the end 28 of the piston 26 is entirely disengaged from the control chamber 18. In the closed position of the valve, the end 30 of the piston 26 is slightly engaged beyond the seal 32 and, in the open position, more deeply engaged.

The wall 38 of the box 34 works in co-operation with two seals 40 and 42, lodged in two grooves cut into the wall of the central chamber 16, so that, in its closed position, the central chamber 16 and the release holes 24 are totally isolated from each other.

Figure 2:
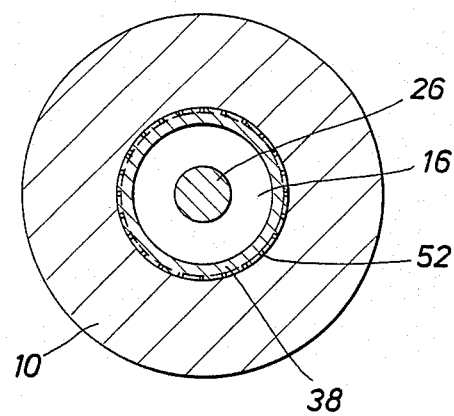
FIG. 2 is a sectional plan view along line II of the valve as shown in FIG. 1.

Two diametrically opposed logitudinal holes 44 are pierced in the bottom 36 of the box 34 and, in the vicinity of the edge of the wall 38 of the box 34, two radial holes 48 are pierced to face each other, the external edges of these radial holes being slanted. Furthermore, as is apparent on FIG. 2, a ring 52 of narrow longitudinal slots (3 to 4 tenths of a millimeter wide) directly or indirectly connected to the radial holes 48, is fitted in the wall 38 of the box 34 and their length is determined so that, in a closed position, this ring of slots 52 does not reach the edge of the groove in which the seal 40 is lodged.

In the base of the central chamber 16 contiguous with the reference chamber 20, two conical studs such as 54 are fixed, these studs being adapted to progressively seal the longitudinal holes 44 of the bottom 36 of the box 34, as this box finishes opening.

In the reference chamber 20 the reference end of a piston 58 is also engaged, coming to bear on the end 30 of the floating piston 26. The reference piston 58 comprises a shoulder 60 adapted to bear on the outside of the plug 12 when the valve is in its closed position. The plug 12 comprises an annular groove whose external wall 62 is threaded to the interior and exterior. Inside this annular groove is set an elastic metal sleeve comprising, on one hand, a collar 64 fitted with a bearing flange 65 and, on the other, a multiplicity of elastic blades 66 separated from each other by a longitudinal slot, each blade being finished by a locking hook 67.

This sleeve is held fixed in its groove by means of an annular screw 68 screwed into the external wall 62 of this groove, the height of the screw 68 determining the stiffness of the elastic blades 66 of the sleeve. The hooks of these blades 66 bear on a ramp 69 fitted onto the shoulder 60 of the piston 58.

A helicoidal spring 70 is mounted to be compressed between the shoulder 60 of the piston 58 and a circular bearing plate 72. This plate 72 is pierced by a central hole crossed by the second end of the piston 58 and held by the internal ledge 74 of a protection cylinder 76 screwed to lock on the outside of the plug 12.

In the vicinity of the base of the central chamber 16, the wall of the valve body 10 comprises two holes 78 and 80 fitted with detachable plugs. These holes enable the central chamber 16 to be emptied and filled with clean oil after each opening of the valve.

Figure 3:
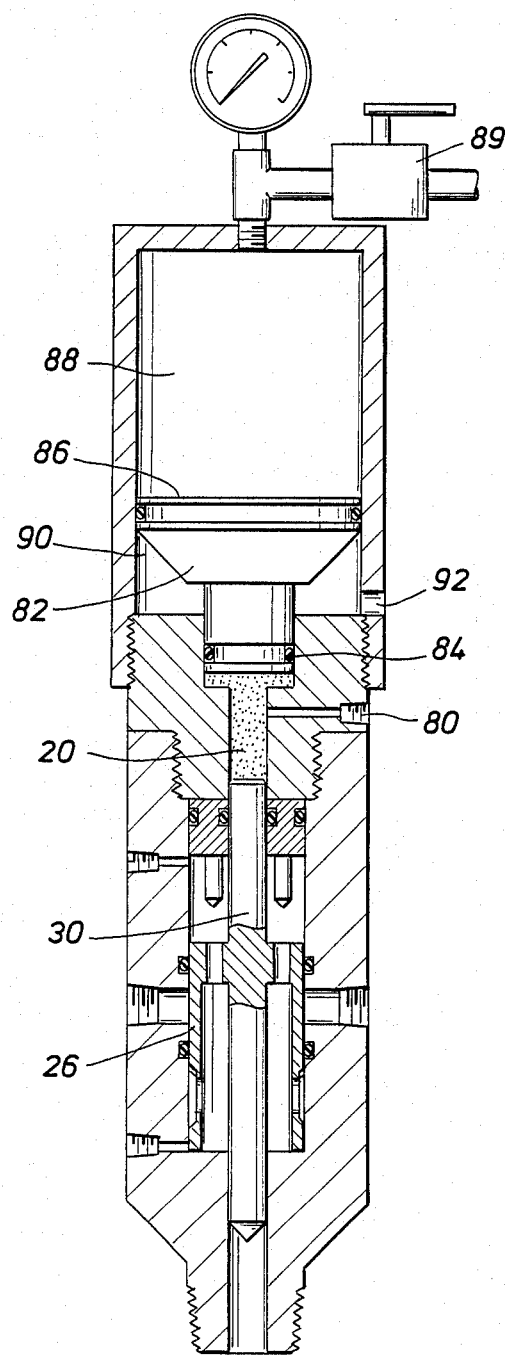
FIG. 3 is a second implementation form of the valve according to the invention, in a closed postion.

According to FIG. 3, the reference end 30 of the control piston 26 emerges into a reference chamber 20 to be filled with oil under pressure, a filling hole 80 having been planned to this effect. In the chamber 20 slides a floating piston 82 equipped with a seal 84. The head 86 of the piston 82 has a section several times greater (5 times, for example) than the base of this piston engaged in the chamber 20. the head 86 of the piston 82 slides in such a way as to create a seal, in an auxiliary chamber 88, filled with a gas under adjustable pressure by means of a control tap 89. The space 90 allowed between the head 86 of the piston 82 and the external edge of the plug 12 emerges by a passage 92 cut into the wall of the chamber 88.

Figure 4:
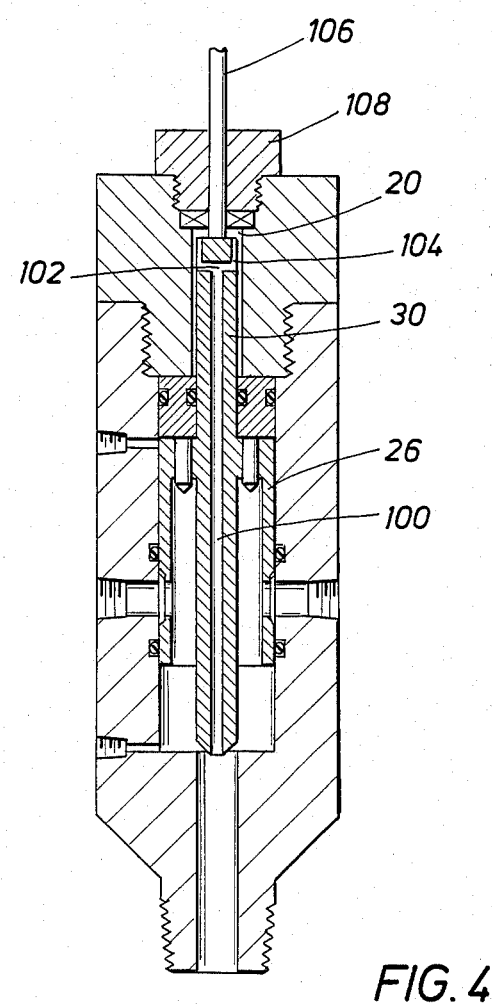
FIG. 4 shows a valve according to the invention, used to control high pressure flows.

According to FIG. 4, the floating piston 26 comprises an axial passage 100 emerging, at its end 30, into a transversal passage 102, the end 30 otherwise comprising at least one external longitudinal groove 104. At the end 30 of the piston 26 is a manual push rod 106 crossing the refernce chamber 20 by the cap 108 of this chamber 20 screwed on the plug 12.

The valve according to the invention being connected with a pipes in which abrasive fluid under very high pressure circulates, this high pressure is constantly applied to the chamber under control 18. When this high pressure generates a thrust on the end 28 of the control piston 26 lower than the reference thrust to which the other end 30 of this piston is subjected, the valve is closed. In this case, the central chamber 16 previously filled with clean oil is subjected to the pressure of the fluid to be controlled since no sealing is assured around the end 28 of the control piston 26 engaged in the control chamber central chamber 16 and the seals 40 and 42 set out on both sides of the release holes 24 in cooperation with the box 34 totally isolate the chamber 16 and the holes 24. In this closed position of the valve, the shoulder 60 of the reference piston 58 is blocked against the outside of the plug 12, the reference thrust to which is thereby subjected the control piston 26 is the force capable to move the shoulder 60.

In the present case, this detaching force is determined, on one hand, by the force maintaining the hooks 67 of the elastic blades 66 in a locked position on the ramp 69 of the shoulder 60 and, on the other hand, by the compression force of the helicoidal spring 70.

By way of example, let us suppose that the pressure of adjustment of the valve being 500 bars, a maintaining force corresponding to a pressure of 300 bars applied to the end 30 of the control piston 26 is developed by the calibrated hooks 67, the remaining adjustment pressure (200 bars) corresponding to the initial compression force of the spring 70.

The moment a sudden overpressure is produced, in the piping of fluid to be controlled, which is greater (for example, 100 bars) than the adjustment pressure of the valve, a force greater than the reference thrust is applied to the end 28 of the control piston 26 engaged in the chamber under control 18. Some abrasive fluid under excessive pressure thus penetrates into the central chamber 16 escaping all around the end 28 of the piston 26. The piston 26 is therefore subjected to an acceleration proportional to the difference in the forces applied to its two ends, whilst a relatively slow movement and small displacement of the piston 26 result. During this short time interval, the circulation of the abrasive fluid around the end 28 of the piston 26 and along the edge of the chamber under control 18, does not bring about detrimental erosion due to the very slight clearance (hundredths of a millimeter, for example) in which this circulation is established, which produces only a slight flow.

With great rapidity, this small displacement is sufficient to cause the ring of longitudinal slots 52, cut in the wall 38 of the box 34 of the piston 26, to engage progressively above the seal 40. As the total passage section of these slots is, by construction, far greater (by at least ten times) than the existing passage section between the end 28 of the piston 26 and the wall of the chamber under control 18, the move of these slots above the seal 40 has the effect of abruptly decompressing the oil contained in the central chamber 16, the pressure drop then being immediately referred to the area around the end 28 of the piston 26. Before and during this decompression, the ring of longitudinal slots slides, without damage, on the seal 40, as a result no perceptible deformation is produced along these particularly narrow slots (3 to 4 tenths of a millimeter) which pass progressively above a seal which is no longer required to fulfill its sealing function. Equally rapidly, this small displacement has the effect of making the hooks 67 of the blades 66 slide on the ramp 69 and of abruptly reducing the adjustment pressure of the valve by 300 bars. The control piston 26 then undergoes a sudden acceleration which causes it to rapidly pick up speed until the radial hole 48, cut in the box's wall 34, begins to be opposite the release hole 24. As this rapid displacement progresses, the clean oil contained in the central chamber 16 on the side of the reference chamber 20 flows out without particular difficulty (the ends 28 and 30 of the piston 26 have the same diameter) through the longitudinal holes cut through the bottom of the box 34. Consequently, the radial hole 48 can arrive, in a few milliseconds, at the point where it is almost entirely opposite the release hole 24. The overpressure to which the chamber under control 18 was subjected the preceeding instant disappears progressively as the oil initially contained in the central chamber 16 and, in case of need, a certain quantity of abrasive fluid, escape through the release hole 24.

The movement of the box 34 does not lessen, for all that, until the conical studs 54 begin to engage in the holes 44 in the bottom of the box 34. From this moment, the movement of the box 34 is strongly decelerated by the lamination of the oil in these holes 44 which are progressively sealed, and no vibration of piston 26 can be generated. When the movement of the box 34 is stopped and the pressure of the fluid in the pipes to be controlled has descended below the adjustment pressure corresponding to the force produced by the spring 70 at that moment, the control piston 26 and the box 34 begin a return movement and the valve, according to the invention, progressively takes up its closed position again, the hooks 67 engaged on the ramp 69.

Owing to the fact that the overpressure thus compensated by the valve is the consequence of an unfortunate accident, the operator will decide to stop the injection system of the abrasive fluid (mud or cement, for example) and will immediately try to master the cause of this accident. At this juncture, he will empty the central chamber 16 of the mud and cement contained in it, by circulating the clean oil via the previously opened apertures 78 and 80. Then he will again close these aperture. The pressure relief valve, according to the invention, is thus again ready for service.

The invention is not, of course, limited to the form of the construction described above. Numerous modifications may be made without departing from the spirit of the invention.

One of these modifications, as illustrated in FIG. 3, consists of replacing the reference piston 58, the spring 70 and the elastic blades 66, by a variable pressure hydraulic accumulator. Such an accumulator is known in the art. In the reference chamber 20, filled with oil, the pressure produced by the narrow base of the piston 82 is much higher than the adjustable pneumatic pressure applied to the large head 86 of said piston. the operation of a safety valve so modified is similar to that of the valve on FIG. 1. It has the advantage of having an adjustable reference pressure and the drawback of a somewhat less rapid opening.

It is worth noting that it is easy, as illustrated on FIG. 4, to transform the pressure relief valve, so modified, into a regulating valve without reaction. To do this, the reference chamber 20 is in direct communication with the fluid to be controlled through the passages 100, 102 and 104 pierced in the control piston 26. By means of a control rod 106 passing through the base of the reference chamber 20, it is easy to displace the control piston 26 in such a way as to obtain, smoothly, a more or less significant opening of the valve thus constructed, whatever the value of the concerned fluid's pressure. As a matter of fact, according to the relative position of the piston end 28 and the edge of the chamber 18, an adjustable pressure drop is generated, so that the pressure in chamber 18 is controlled.

What is claimed is:

1. A pressure relief valve comprising:
   a hollow body closed by a plug defining a revolution volume having a relatively large central chamber and two relatively narrow opposing chambers, said central chamber comprising a release hole, fitted with sealing means,
   a floating piston having its ends engaged in said opposing chambers, one side of said piston being subjected to a reference thrust and the other to the pressure of the fluid to be controlled,
   said opposing chambers are a reference chamber and a chamber under control having identical diameters, and said floating piston comprises in its median section, a cylindrical box, having a bottom and a wall, said box being adapted to slide in said central chamber, at least one longitudinal hole being pierced in said bottom and at least one radial hole pierced in said wall,
   so that in a closed position of the valve, the wall of said box closes said release hole in a sealed manner, and the floating piston closes said chamber under control in a non-sealed manner and, in an open position of the valve said piston is clear ot the chamber under control and said radial hole is placed opposite said release hole.

2. A pressure relief valve according to claim 1, wherein the wall of the box comprises narrow channels connected to said radial hole, said channels being adapted to slide, without damage, over a seal associated with the release hole, during the first part of the valve's opening movement.

3. A pressure relief valve according to claim 2, wherein the total passage section of said narrow channels is far greater than the total passage included between the end of the piston engaged in said chamber under control and the internal wall of this same chamber.

4. A pressure relief valve according to claim 1, wherein at least one stud mounted fixed in the base of the central chamber is adapted to progressively seal the longitudinal hole pierced in the bottom of said box when said box finishes its opening movement.

5. A pressure relief valve according to claim 1, wherein the reference thrust applied to the end of said control piston is developed by a spring and by hooks having a calibrated release, said springs and hooks being mounted to bear on the shoulder of a reference piston engaged in said reference chamber.

6. A pressure relief valve according to claims 1 to any one of 4, wherein the reference thrust applied to the end of said control piston is generated by a hydraulic accumulator comprising a reference chamber filled with oil, a separation piston and an auxiliary chamber filled with gas and means for adjusting the pressure of said gas.

7. A valve comprising a pressure relief valve according to any one of claims 1 to 4, wherein said reference chamber communicates with the chamber under control and wherein the end of the control piston is conected to a control rod crossing the base of said reference chamber.

* * * * *